United States Patent

Reichel

[11] 4,034,205
[45] July 5, 1977

[54] APPARATUS HAVING MULTIPLE HEATING WIRES FOR HEATING OF A FLAT WORKPIECE

[76] Inventor: Wilfried Reichel, Muhle 1, 6501 Bubenheim, Germany

[22] Filed: Aug. 19, 1975

[21] Appl. No.: 605,916

[30] Foreign Application Priority Data

Aug. 28, 1974 Germany .......................... 2441181

[52] U.S. Cl. .............................. 219/385; 156/380; 156/499; 219/521; 219/524; 425/384
[51] Int. Cl.² ......................................... F27D 11/02
[58] Field of Search .......... 219/385, 388, 520, 521, 219/524, 525, 530, 19 WC; 156/380, 499, 583, 515; 83/171; 425/384

[56] References Cited

UNITED STATES PATENTS

| | | | |
|---|---|---|---|
| 508,819 | 11/1893 | Daft | 83/171 |
| 3,015,600 | 1/1962 | Cook | 156/515 X |
| 3,283,469 | 11/1966 | McBrady et al. | 53/22 |
| 3,321,353 | 5/1967 | Zelnick | 156/499 |
| 3,330,716 | 7/1967 | Zelnick | 156/380 |
| 3,347,729 | 10/1967 | Seefluth | 156/380 |
| 3,574,037 | 4/1971 | Deans et al. | 156/380 X |

*Primary Examiner*—Volodymyr Y. Mayewsky
*Attorney, Agent, or Firm*—Toren, McGeady and Stanger

[57] ABSTRACT

An apparatus for rectilineal heating of a flat workpiece of thermoplastic material, so that the workpiece is bendable upon heating, includes first and second frame-shaped supports, the second support being positionable opposite the first support. The second support is pivotally mounted so that it can be swung upwardly away from the first support. The apparatus further includes first and second pairs of bars which are substantially juxtaposed with one another and displaceably disposed on the first and second supports, respectively, for gripping the workpiece, and at least one heating wire forming a heat source for contactless operation which is strung between at least one pair of the bars. The heating wire can be variably spaced on at least one side of and with respect to the workpiece.

7 Claims, 2 Drawing Figures

APPARATUS HAVING MULTIPLE HEATING WIRES FOR HEATING OF A FLAT WORKPIECE

BACKGROUND OF THE INVENTION

1. Field of the Invention

The invention relates to an apparatus having multiple heating wires for heating of a flat workpiece made of thermoplastic material within a region of a subsequent deformation of the workpiece.

2. Description of the Prior Art

Workpieces made of thermoplastic material must be plastified prior to deformation, for example prior to bending, by heating. Such heating should be limited locally and be accomplished in a contactless manner, particularly in the case of glasslike transparent synthetic plastic materials.

A heating apparatus for local heating of plates made of thermoplastic synthetic is known, wherein the heat source consists of two juxtaposed heating swords or blades, whose cutting edges abut a plate spaced and gripped therebetween. This apparatus is, however, unsuitable, for the bending of glasslike transparent materials, since the cutting edges of the blades are pressed into the material deforming the same, the deformations remaining annoyingly visible on the completed workpiece.

This deficiency no longer occurs in another known heating apparatus, which operates in a contactless manner by means of heating rods or bars. But it is not possible even by means of this apparatus to heat glasslike plates of synthetic plastic material in such a fashion that the bent edge is devoid of any deficiencies. Experiments have proved that the heating rods of a great many different manufacturers have shown considerable temperature variations over their length. Of 100 heating rods examined only 3 showed a somewhat uniform temperature distribution, and only to the extent that they were new. A workpiece made of acrylic glass of 10 mm thickness preheated with such heating rods and subsequently bent showed considerable refraction phenomena upon a light passing therethrough in the form of nonuniform bending radii, whereby it became unsuitable for its intended application.

SUMMARY OF THE INVENTION

Therefore it is an object of the present invention to develop a heating apparatus for local heating of workpieces of a thermoplastic synthetic material, which operates in a contactless manner and heats the workpiece uniformly over the total length to be deformed, whereby the surface to be heated should be adjustable with respect to its width, and the temperature to be applied should be regulatable or controllable with respect to its magnitude and effectiveness. The apparatus should also be suitable to heat a plurality of workpieces simultaneously, or one workpiece simultaneously at a multiplicity of locations in order to reduce the operating time and/or in order to produce a predetermined profile or section-shape in one operation.

Therefore an apparatus is provided for local rectilineal heating of a flat workpiece of thermoplastic material, so that the workpiece is bendable upon heating, which includes first and second frame-shaped supports, the latter support having a longitudinal axis and being substantially symmetrical with the former support about, and pivotable upwardly with respect to the longitudinal axis. The apparatus, according to the invention, includes first and second pairs of bar means which are substantially juxtaposed with one another and displaceably disposed on the first and second supports, respectively, for gripping the workpiece, and at least one heating wire means forming a heat source for contactless operation which is strung between at least one pair of the bar means, and variable spaced on at least one side of the workpiece, with respect to the distance of the workpiece from the at least one of the wire means.

It is further advantageous if the respective spacings of at least one of the pairs of the bar means to the heating wire means disposed therebetween is variable and adjustable with respect to the workpiece to be operated on and the thickness and bending requirements thereof. It is additionally advantageous if at least one of the bar means of the pairs thereof is coolable in dependence on the bending requirements of the workpiece. It is also advantageous if at least one of the bar means of the pairs thereof is traversable by a cooling means. It is additionally preferable if the at least one of the heating means is longitudinal and has a length variable in dependence on the temperature, and further includes tension means disposed at least on one side of the longitudinal heating means for equalization of its longitudinal variation; the tension means is preferably a tension spring.

It is finally advantageous if the apparatus includes regulating means for presettably regulating the temperature and/or the duration of heating of the at least one of the heating means, and indicating means for displaying the temperature and/or the duration of the heating.

The advantages obtained by the apparatus according to the invention are particularly due to the one or several strip-portions of a panel or plate to be bent upon heating being selectably controllable simultaneously on one or both sides with respect to the width of heating and the magnitude of the temperature, being heatable over their whole length uniformly and in a contactless manner and being thereby rendered plastifiable, whereby the one or several wires are prevented by their respective tension means from sagging, which results in a uniform distance of the heating wires to the workpiece. By a selectable cooling of individual bar means, or of all bar means of the pairs thereof which grip the workpiece and between which the heating wire means are disposed, the heat distribution in the workpiece can additionally be controlled in dependence on the required deformation of the workpiece upon heating.

BRIEF DESCRIPTION OF THE DRAWING

The invention will be better understood with reference to an embodiment example thereof illustrated in the accompanying drawing, in which.

DESCRIPTION OF THE PREFERRED EMBODIMENT

Figure 1:
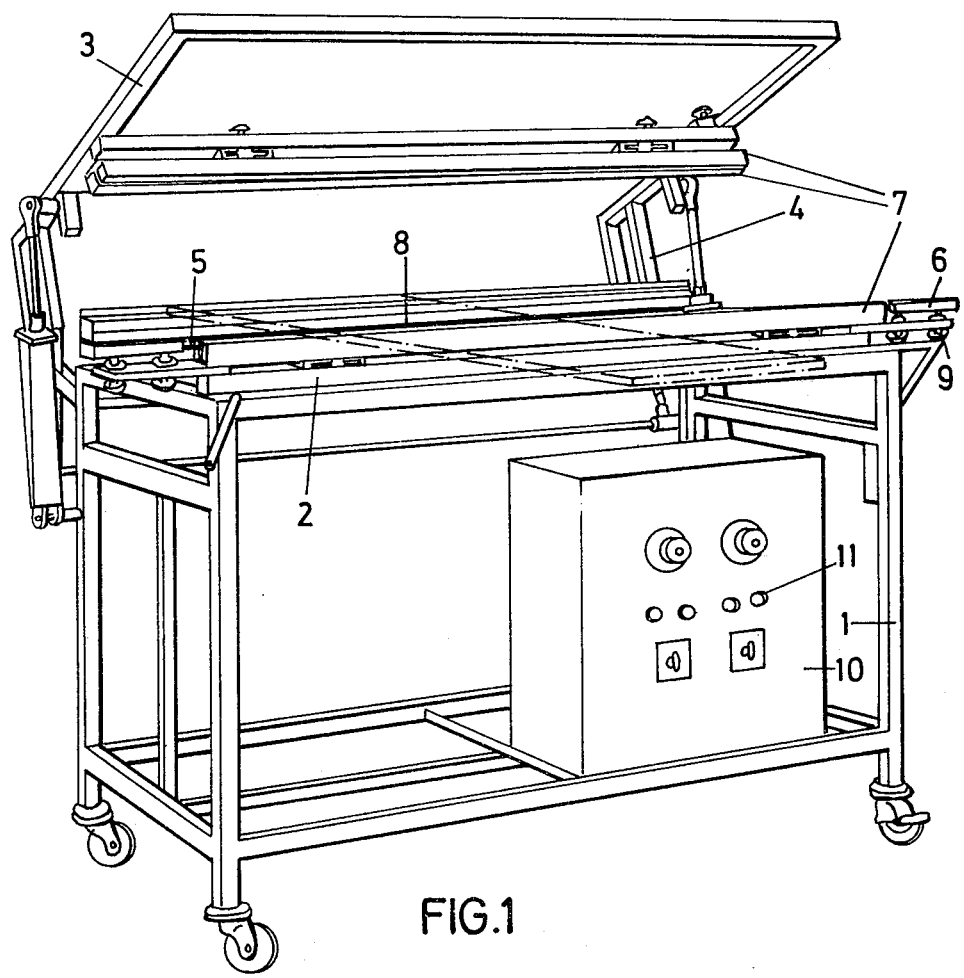
FIG. 1 shows a perspective view of the apparatus according to the invention.
Figure 2:
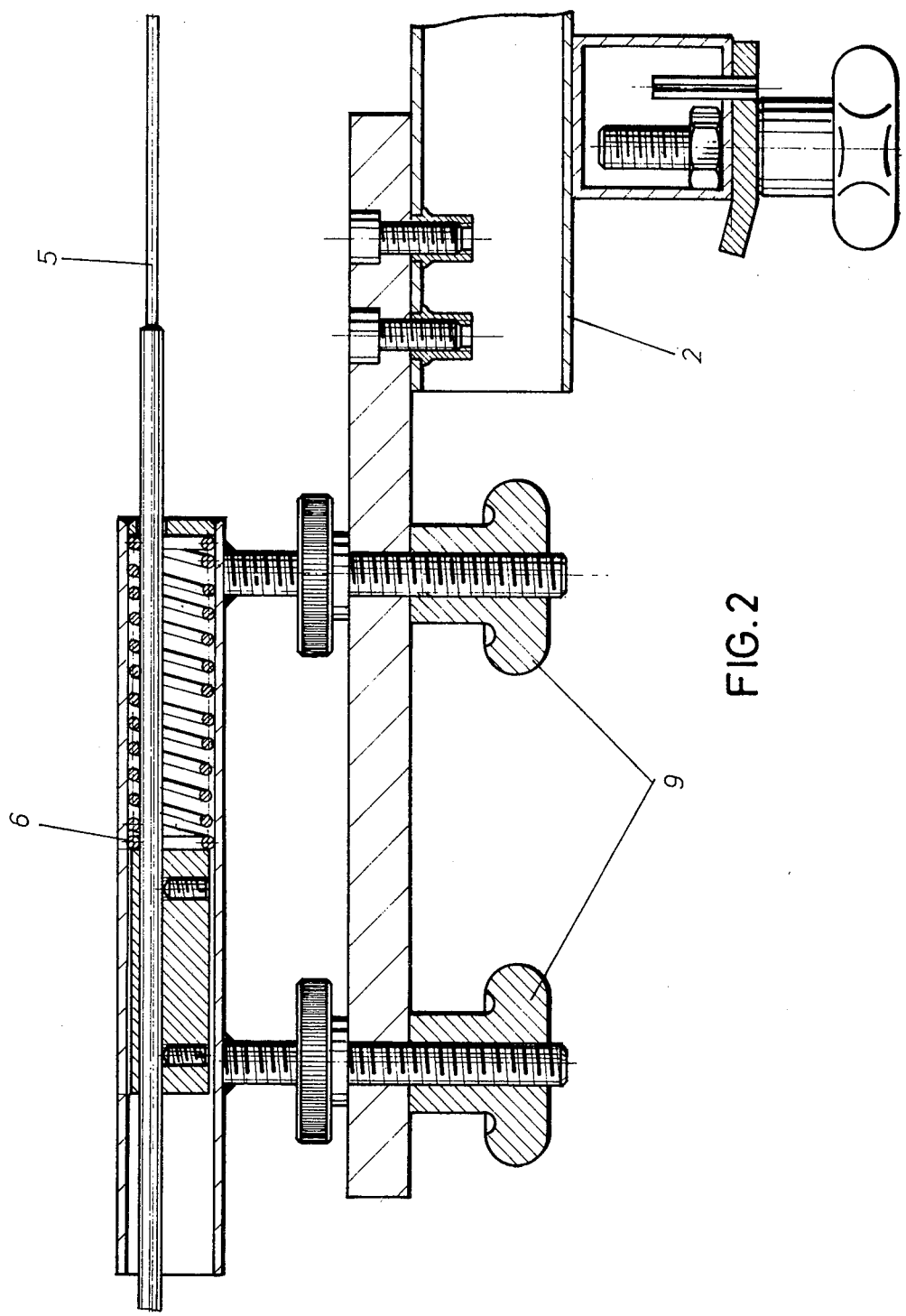
FIG. 2 shows an elevational view partly in section of the spring-loaded mounting support of a heating wire means.

A frame 1, which is transportable, carries a first frame-shaped support 2 and a second frame-shaped support 3 similar in construction to the first support. In the operative position the second support 3 is spaced closely above the first support 2 and the second support is pivotally mounted on the frame so that it can be swung upwardly from the first support. This second support 3 is pivoted by means of parallel guidance means 4 on the frame 1 so that it can be disposed in the operative position in a parallel position with respect to the workpiece independent of the thickness of the workpiece.

Electrically heated heating wires 5 are prestressed at least at one end by a spring 6 or other suitable means for equalization of respective temperature-dependent longitudinal variations, and are disposed between individual bars of the two pairs of bars 7 installed displaceably on respective supports 2 and 3. In the operative position of the first and second supports 2, 3, the two juxtaposed pairs of bar 7 also grip the workpiece 8. By means of adjusting screws 9, or the like, the wires 5 are additionally adjustable with respect to their respective distances to the workpiece. Also both individual bars of each pair of bars 7 are adjustable with respect to the spacing of the respective heating wire 5 disposed therebetween in order to regulate the effective heating width of these heating wires relative to the workpiece and to adjust them to the desired deformation of the workpiece.

Individual, several, or all of the bars are also coolable according to the desired deformation in any arbitrary fashion, i.e., either by ribs disposed thereon or by cooling means passing therethrough or contained therein.

The temperature of the heating wire 5 is, of course, also presettable both as regards its magnitude and its duration via electrical power supplied thereto, whereby signal-indicating means 11 display the current operating state. This regulation is preferably accomplished by a regulating or control means 10 installed in the frame 1.

What is claimed is:

1. An apparatus for local rectilineal heating of a flat workpiece of thermoplastic material, so that the workpiece can be bent when it is heated, comprising a first frame-shaped support, a second frame-shaped support pivotally displaceably between a first position disposed opposite, parallel and adjacent to said first support and a second position swung upwardly from the first position away from said first support, a first pair of longitudinally extending bar displaceably mounted on said first support, a second pair of longitudinally extending bars displaceably mounted on said second support, said first pair of bars spaced from and aligned opposite said second pair of bars in the first position of said second support and forming a first space therebetween for gripping the workpiece between said first pair and said second pair of bars, the bars in each said pair spaced laterally apart to form a second space therebetween facing toward and open to the first space between said first and second pair of bars, at least one heating wire forming a heat source and positioned in the second space between at least one of said pairs of first and second bars for effecting contactless heating of the workpiece gripped in the first space, and means for variably spacing said heating wire within the second space with respect to the first space for varying the distance between said heating wire and the workpiece, the lateral spacing between the bars in the at least one of the said pairs of bars with said heating wire therebetween is variable for varying the spacing between said bars and said heating wire in accordance with the thickness and the bending requirements of the workpiece to be bent.

2. An apparatus according to claim 1, wherein means are incorporated with at least one pair of said pair of bars for cooling the bars in dependence on the bending requirements of the workpiece.

3. An apparatus according to claim 2, wherein said means for cooling said bars comprises a passage through said bars for flowing a cooling fluid therethrough.

4. An apparatus according to claim 1, wherein said at least one heating wire extends longitudinally through the second space in which it is located and has a length variable in dependence on the temperature developed thereby, and tension means disposed at at least one end of said heating wire for equalizing the longitudinal variation of said wire and preventing sag in said heating wire for maintaining the desired spacing between said wire and the workpiece.

5. An apparatus according to claim 4, wherein said tension means is a tension spring.

6. An apparatus according to claim 1, wherein regulating means are mounted on said first frame and connected to said heating wire for regulating the temperature of said heating wire, and indicating means connected to said heating wire for displaying the temperature thereof.

7. An apparatus according to claim 6, wherein said regulating means are arranged for regulating the duration during which heat is supplied from said heating wire to the workpiece and wherein said indicating means displays the duration during which heat is provided by said heating wire.

* * * * *